US007995014B2

(12) United States Patent
Lin et al.

(10) Patent No.: US 7,995,014 B2
(45) Date of Patent: Aug. 9, 2011

(54) METHOD OF INCREASING COLOR GAMUT OF A COLOR DISPLAY

(75) Inventors: Wei-Ping Lin, Taipei (TW); Tsung-Hsun Yang, Hsinchu (TW); Ching-Cherng Sun, Yangmei Township, Taoyuan County (TW)

(73) Assignee: National Central University, Taoyuan County (TW)

( * ) Notice: Subject to any disclaimer, the term of this patent is extended or adjusted under 35 U.S.C. 154(b) by 797 days.

(21) Appl. No.: 11/964,222

(22) Filed: Dec. 26, 2007

(65) Prior Publication Data

US 2009/0167788 A1 Jul. 2, 2009

(51) Int. Cl.
*G09G 3/32* (2006.01)
*G09G 3/30* (2006.01)
*G09G 3/36* (2006.01)
*G09G 3/10* (2006.01)
*G06F 3/038* (2006.01)

(52) U.S. Cl. ............ 345/83; 345/76; 345/102; 345/204; 315/169.3

(58) Field of Classification Search .................. 345/102, 345/83, 204, 76, 77, 82; 349/61–71; 313/463; 315/169.3
See application file for complete search history.

(56) References Cited

U.S. PATENT DOCUMENTS

| | | | | |
|---|---|---|---|---|
| 6,115,016 | A * | 9/2000 | Yoshihara et al. | 345/88 |
| 6,509,904 | B1 * | 1/2003 | Lam | 345/613 |
| 7,164,454 | B2 | 1/2007 | Numata et al. | |
| 2006/0023003 | A1 * | 2/2006 | Yamanaka | 345/690 |
| 2008/0055525 | A1 * | 3/2008 | Igeta et al. | 349/114 |

* cited by examiner

*Primary Examiner* — Lun-Yi Lao
*Assistant Examiner* — Sosina Abebe

(57) ABSTRACT

A method of increasing color gamut of a color display includes grouping subpixels of R, G, and B primary colors of a pixel by grouping R, G, and B light sources of the color display with a corresponding light intensity adjustment mechanism based on an overlapping degree between two response spectrums of the light sources. The response spectrums of the light intensity adjustment mechanism of the same group have minimal overlapping with that of other groups. The method further includes enabling groups of R, G, and B subpixels, activating the R, G, and B light sources and the corresponding light intensity adjustment mechanism, and disabling the remaining groups of subpixels all by turns for creating a vivid complete picture by time division color-mixing.

4 Claims, 10 Drawing Sheets

METHOD OF INCREASING COLOR GAMUT OF A COLOR DISPLAY

BACKGROUND OF THE INVENTION

1. Field of the Invention

The invention relates to methods of increasing color gamut of a color display and, more particularly, to a backlight driving method increasing color gamut of a color display so as to make a picture shown on the display to be more vivid.

2. Description of Related Art

Typically, a light-emitting diode (LED) may be employed to illuminate an indicator lamp, a traffic light, a floodlight, a vehicle light, or a backlight module of a display.

Generally, red (R), green (G), and blue (B) single chips are incorporated into an LED or R, G, and B LEDs are combined to emit white light. Both are widely employed as a backlight source by industry, i.e., LED as the backlight source. This has many advantages including no energy consumption resulting from the conversion of fluorescence powder and color temperature being adapted to change by controlling light intensity of each R, G, and B LEDs.

Following is a comparison between an RGB LED backlight source and a conventional cold cathode fluorescent lamp (CCFL) backlight source with respect to color. For the CCFL backlight source, it is high in the performance of blue color but low in the performance of red and green colors. Hence, such type of LCD (liquid crystal display) display tends to emit blue light. As a result, the color gamut of a CCFL backlight source is only about 70% of that defined by the color television broadcast standard published by the National Television Standards Committee (NTSC). The color gamut of a newly developed CCFL is only about 95% of that defined by the NTSC. However, theoretically, the LED backlight source can have a color gamut more than 120% NTSC by mixing RGB lights. This is much better than 70%-95% of that of CCFL. Hence, many major display device manufacturers make every effort to develop a display employing three-color LEDs as the backlight source.

In fact, a transmission spectrum of a blue wavelength largely overlaps that of a green wavelength in a typical color filter (CF). Hence, blue light emitted by an LED backlight passing through a CF always leaves from a green CF. Similarly, green light emitted by an LED backlight passing through a CF always leaves from a blue CF. Hence, purity of the three primary colors of light emitted by a display is decreased significantly. As a result, a color gamut of the display is decreased undesirably. This is an important technical issue to be addressed when considering the high color saturation requirement of a display.

For solving the problem of low color saturation of a display, Yoichi Taira et al proposed a brand new structure of color display by introducing a color filterless in 2003 and as shown in FIG. 10. In this proposal, LEDs in the backlight source are employed to adjust and control color of a display. This technique was first disclosed by Korea's Samsung Company in the Yokohama show in October 2005. In addition, Taiwan's Chunghwa Picture Tubes Company exhibited a 32" color liquid crystal display (LCD) display with color filterless LEDs in June 2006.

Color filterless display is a display device which employs no color filter. In the technical field, color mixing is achieved by temporal color-mixing rather than by spatial color-mixing. This has the benefit of producing many different colors in pixels on a display by only employing a small number of light sources of primary colors. Spatial color-mixing means that people can see different colors on a color display depending on pixels. A pixel is comprised of subpixels of primary colors (e.g., red, blue and green color subpixels). These subpixels are shown in a visible frequency range smaller than that people can see to cause the effect of color-mixing to occur. Employing temporal color-mixing can make each primary color light (such as red, blue or green color) of the display to switch sequentially quickly in the same space. If the switching speed is faster than the time needed for a person's eyes to distinguish different colors, the effect of temporal color-mixing can be achieved because of the persistence of vision. A new structure of a color display of temporal color-mixing employs multicolor LEDs (such as red, green and blue LEDs) as a backlight source. These multicolor LEDs are adapted to flash at different time intervals. Next, liquid crystal controls brightness of each color to show a desired color in a picture.

The above description regarding a color LCD display with color filterless LEDs employing temporal color-mixing demonstrates many advantages including no CF and increased light efficiency. A backlight source is achieved by each color LED flashing at different time intervals. Power consumption is also decreased. Thus, the problem of insufficient heat removal of the LED backlight is easily solved.

However, a required condition of manufacturing a color LCD display with color filterless LEDs is that the liquid crystal itself should have a very quick response time to match with the speed threshold of temporal color-mixing, which is very difficult to achieve in view of current technology. Besides, in a technology of employing a six-color LED, the complexity of color adjustment increases significantly. However, there are no disclosures addressing the above problems experienced by color displays.

The closest prior art to the invention described hereinafter is U.S. Pat. No. 7,164,454.

SUMMARY OF THE INVENTION

It is therefore one object of the invention to provide a method of increasing a color gamut of a color display device, comprising the steps of (i) grouping subpixels of red (R), green (G), and blue (B) primary colors of a pixel by grouping light sources of different primary colors of the color display device with a corresponding light intensity adjustment mechanism based on an overlapping degree between two response spectrums of the light sources such that the response spectrums of the light intensity adjustment mechanism of the same group have minimal overlapping with that of other groups; (ii) enabling a first group of subpixels of a first primary color at a first time frame, activating a first primary color light source to emit a first primary color light and the corresponding light intensity adjustment mechanism, and disabling the remaining groups of subpixels of different primary colors; (iii) enabling a second group of subpixels of a second primary color at a second time frame, activating a second primary color light source to emit a second primary color light and the corresponding light intensity adjustment mechanism, and disabling the remaining groups of subpixels of different primary colors; and (iv) enabling a third group of subpixels of a third primary color at a third time frame, activating a third primary color light source to emit a third primary color light and the corresponding light intensity adjustment mechanism, and disabling the remaining groups of subpixels of different primary colors, for creating a complete picture by time division color-mixing.

The above and other objects, features and advantages of the invention will become apparent from the following detailed description taken with the accompanying drawings.

DETAILED DESCRIPTION OF THE PREFERRED EMBODIMENTS

Figure 1:
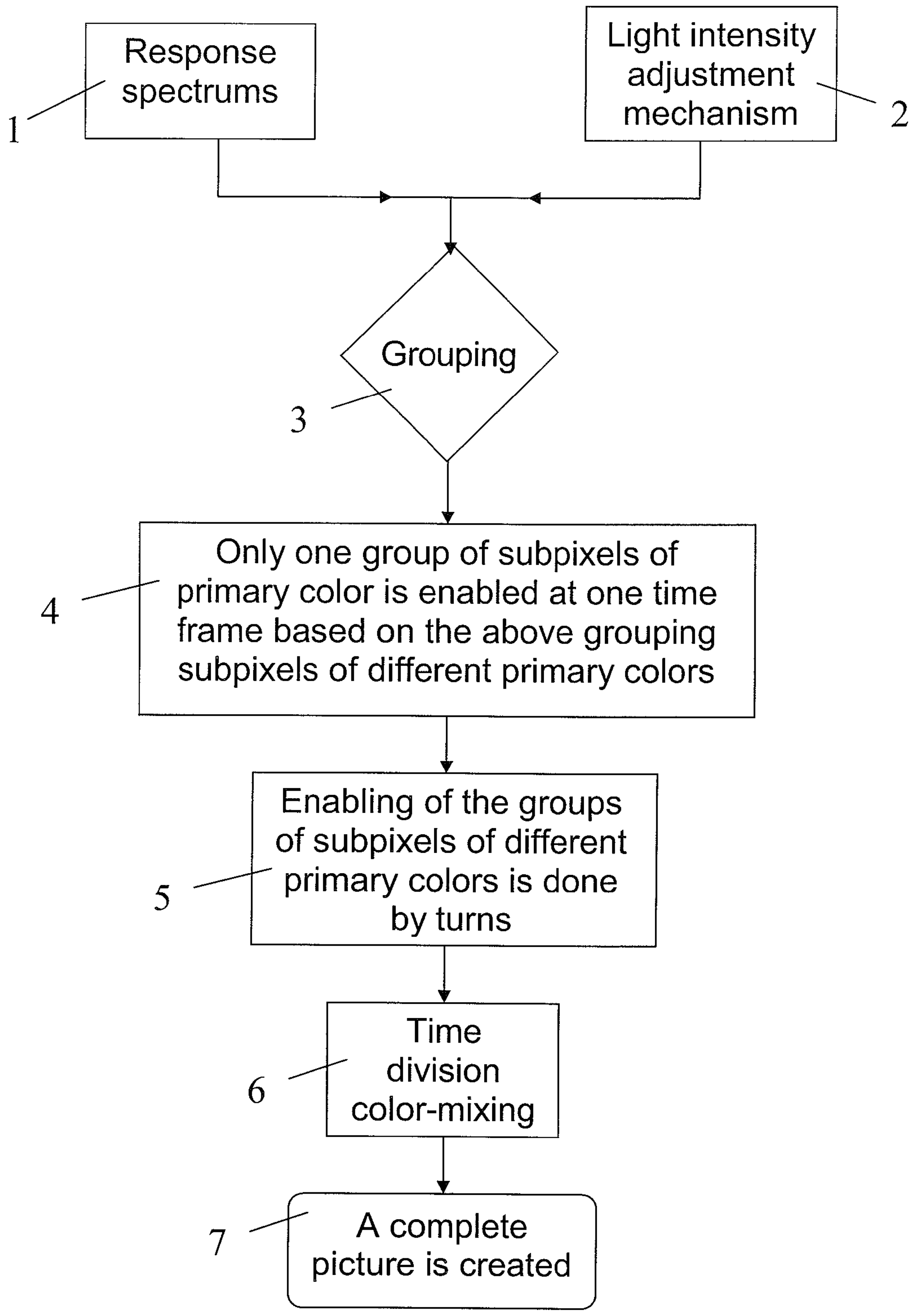
FIG. 1 is a flowchart depicting a method of increasing color gamut of a color display according to the invention.
Figure 2:
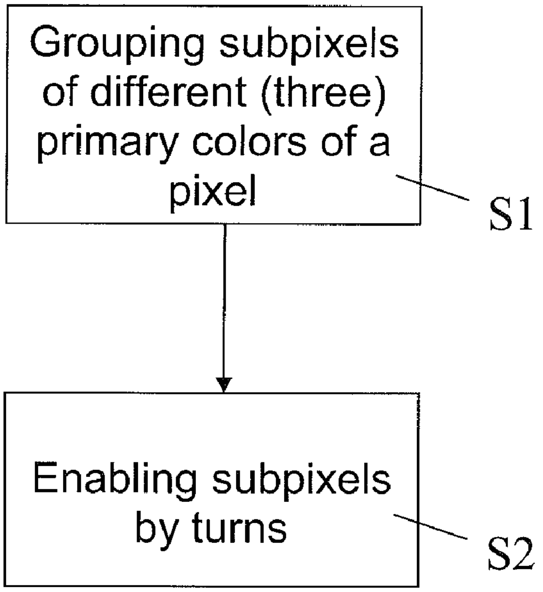
FIG. 2 is a view illustrating two steps of the method according to the invention.

The invention is directed to a method of increasing color gamut of a color display as illustrated in FIGS. 1 and 2. The method comprises following steps:

Step S1 involves grouping subpixels of different (three) primary colors of a pixel. In detail, Step S1 involves grouping (numeral 3 in FIG. 1) light sources of respective primary colors of a color display with a corresponding light intensity adjustment mechanism (numeral 2 in FIG. 1) based on an overlapping degree between two response spectrums (numeral 1 in FIG. 1) of the light sources. As such, the response spectrums 1 of the light intensity adjustment mechanism 2 of the same group have minimal overlapping with that of other groups. Primary color lights of each group are comprised of subpixels of the same primary color.

The light intensity adjustment mechanism of each primary color of the color display comprises a plurality of components which have the capability of adjusting light intensity of each primary color light of the color display. These components include resistors, liquid crystals, and polarizers in an LCD display device.

Step S2 involves enabling subpixels by turns. In detail, only one group of subpixels of a primary color is enabled at one time frame based on the above grouping of subpixels of different primary colors (numeral 4 in FIG. 1). That is, a primary color light source is activated to emit the primary color light and the corresponding light intensity adjustment mechanism is activated. Other groups of subpixels of different primary colors are disabled at the same time. In a next time period, another group of subpixels of a different primary color is enabled with the remaining groups of subpixels of different primary colors being disabled. That is, enabling of the groups of subpixels of different primary colors is done by turns (numeral 5 in FIG. 1). Finally, a complete picture is created (numeral 7 in FIG. 1) by time division color-mixing (numeral 6 in FIG. 1).

Figure 3:
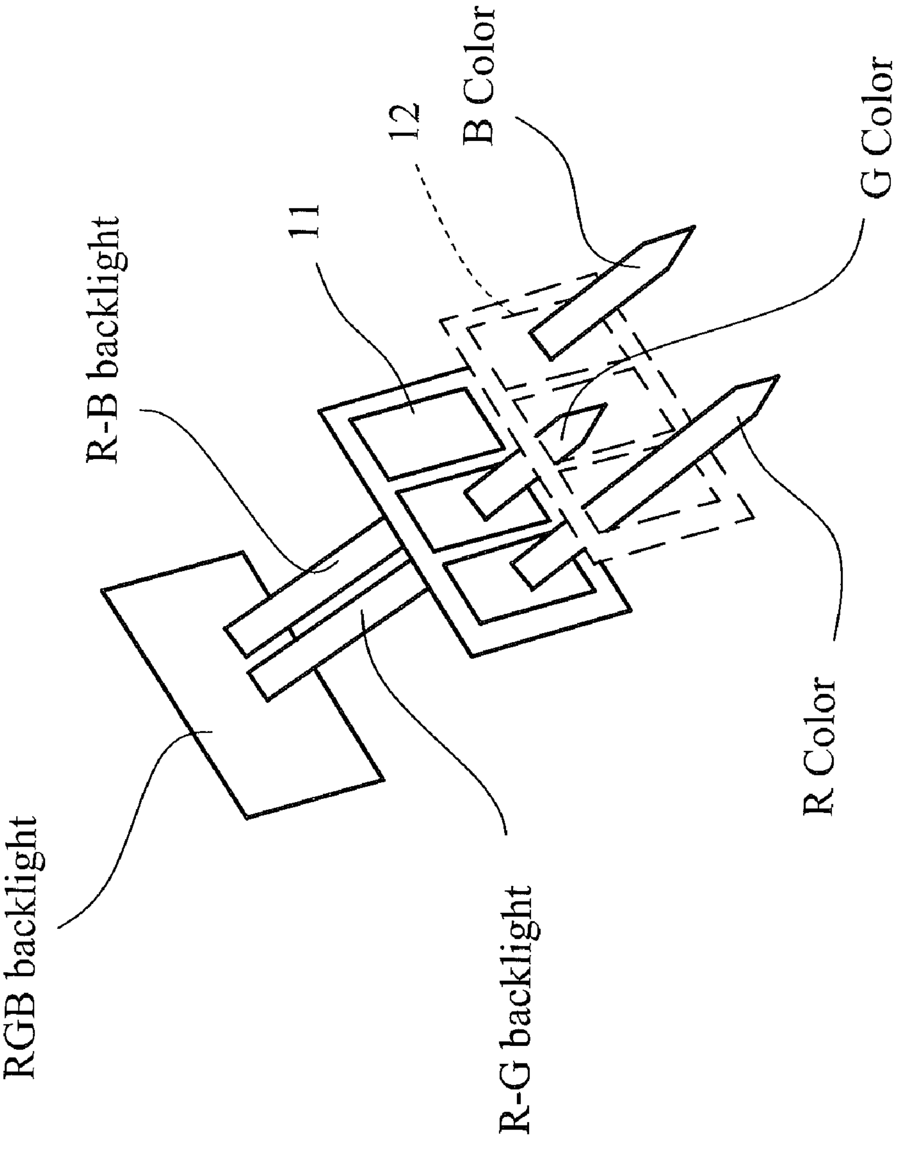
FIG. 3 is a schematic view of a pixel employed by the method according to the invention.
Figure 4:
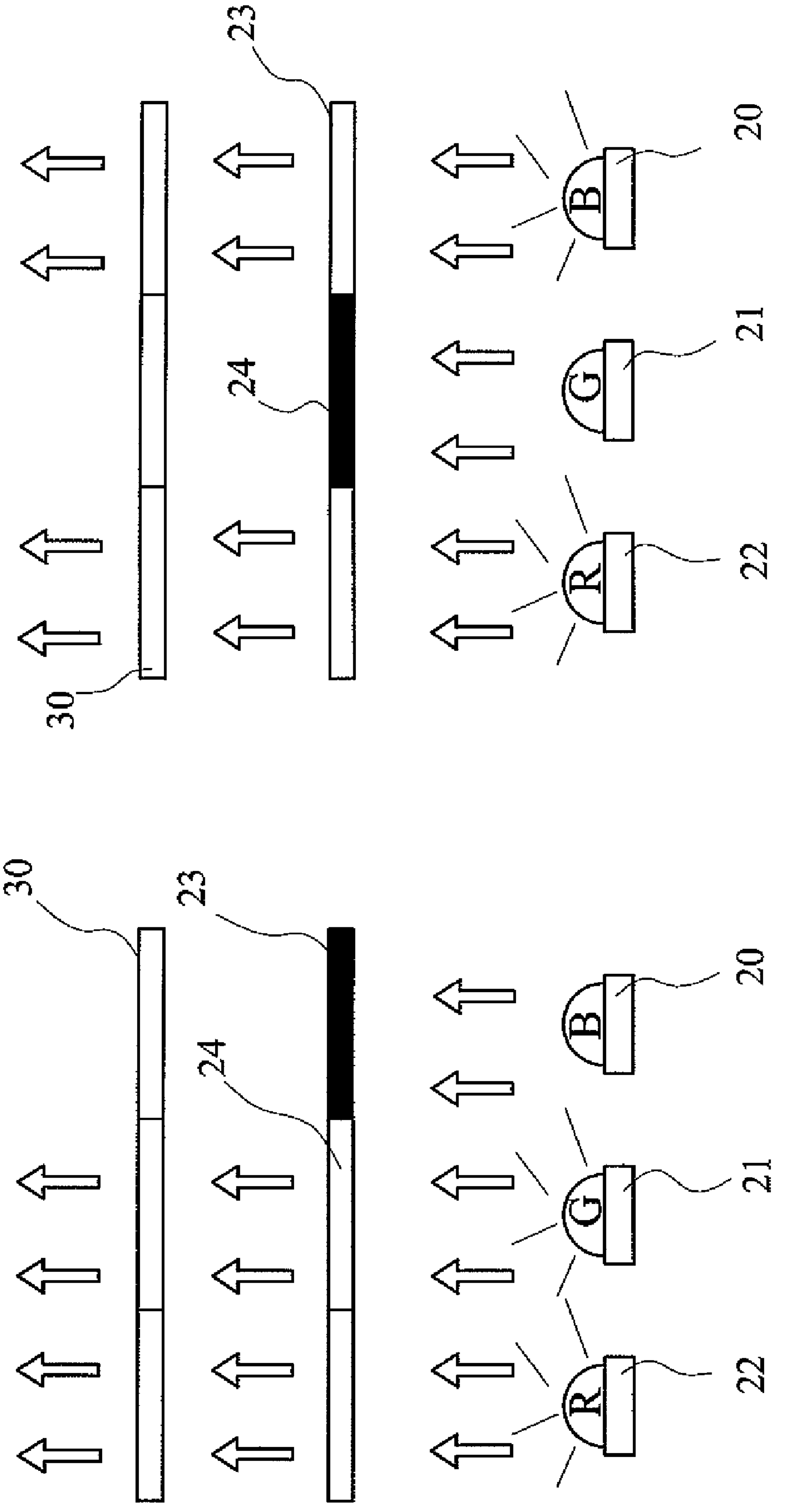
FIG. 4 is a schematic view illustrating B and G backlight LEDs according to the invention flashing sequentially at different time intervals.

Referring to FIGS. 3 and 4, the method of the invention will be further illustrated by discussing a preferred embodiment below.

Each pixel provided with R, G, B primary colors is segmented into two subpixels including an R-G subpixel 11 and an R-B subpixel 12. As such, a liquid crystal pixel 23 corresponding to blue (B) light is disabled when backlight of a green (G) light source 21 passes through a color filter (CF) 30. Likewise, a liquid crystal pixel 24 corresponding to a green light is disabled when backlight of a blue light source 20 passes through the CF 30. Hence, backlight of the blue light source 20 and backlight of the green light source 21 flash alternately at different time intervals in order to prevent blue and green pixels from leaking light to each other. Backlight of the red (R) light source 22 corresponding to the R-G subpixel 11 or the R-B subpixel 12 is not processed, because spectrum overlapping is minimal. Moreover, making backlight flash time of the blue and green light sources 20 and 22 shorter than the time needed for the eyes to perceive will cause the flashing not to be found by the eyes because of the persistence of vision. As a result, the effect of each color being created by mixing by each pixel is created.

The blue light source 20 comprises a blue LED, the green light source 21 comprises a green LED, and the red light source 22 comprises a red LED, respectively.

When the backlight of the green light source 21 flashes, the liquid crystal pixel 23 corresponding to blue light is disabled. Thus, backlight leakage from the blue light source 20 is prohibited when a green pixel is enabled. To the contrary, in a next time frame, the backlight of the blue light source 20 is enabled, and the liquid crystal pixel 24 corresponding to green light is disabled. Hence, backlight leakage from the green light source 21 is prohibited when a blue pixel is enabled. As long as the backlight flash time of the blue and green light sources 20 and 22 is shorter than the time needed for the eyes to perceive will cause the flashing not to be found by the eyes. As a result, the effect of each color being created by mixing by each pixel is created. In such a manner, purity of the three primary colors of the display increases significantly, thereby greatly increasing the color gamut of display.

The invention is featured by increasing color gamut without changing many mechanisms of an existing LED backlight display, not requiring a very fast liquid crystal response time, and providing simple manufacturing processes.

In the invention, LEDs are employed as backlight sources in an experimental backlight module. Specifications and features of the backlight module are shown in the following Table 1.

TABLE 1

Specifications of a three-color LED

| LED Model | Color | Dominant Wavelength | Width of Half-Height Wavelength |
|---|---|---|---|
| Luxeon ™ Emitter LXHL-PD01 | Red | 635 nm | 20 nm |
| Luxeon ™ Emitter LXHL-PM01 | Green | 518 nm | 33 nm |
| Luxeon ™ Emitter LXHL-PB01 | Blue | 458 nm | 22 nm |

Figure 5:
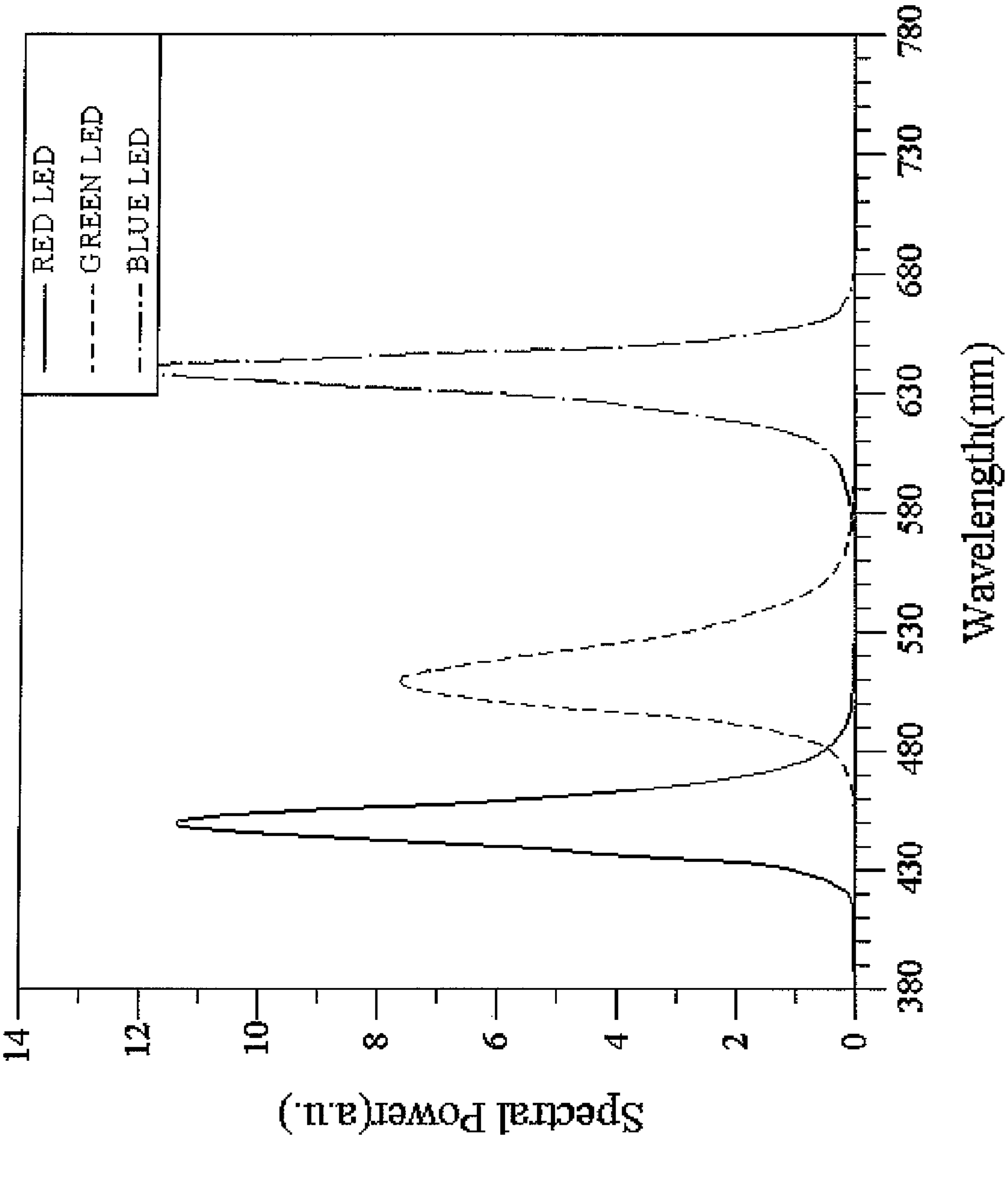
FIG. 5 plots wavelength versus spectral power for R, G, and B LEDs according to the invention.
Figure 6:
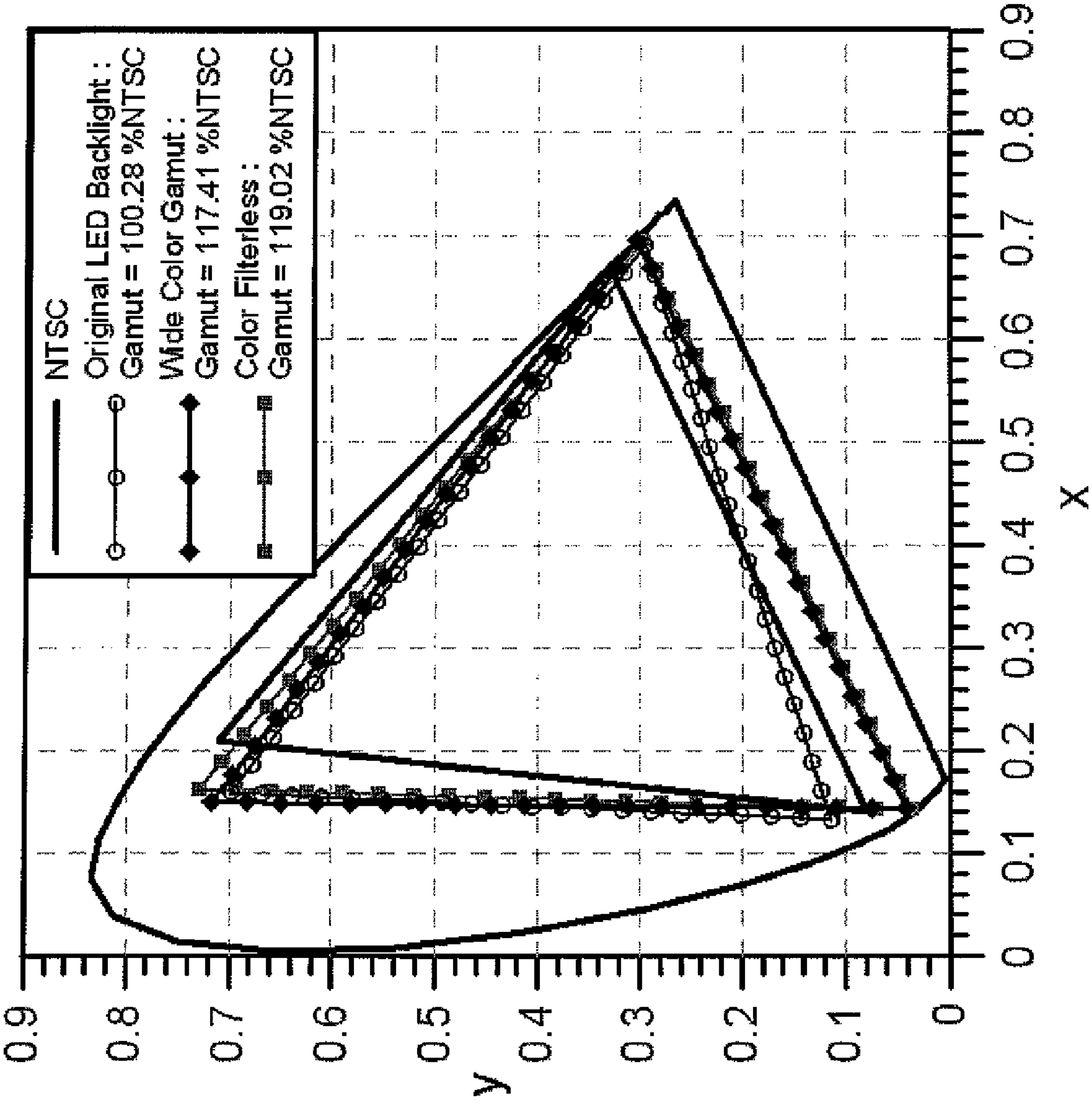
FIG. 6 is a chromaticity diagram of NTSC, original LED backlight, wide color gamut, and color filterless for comparison according to the invention.

An integrating sphere photometer is employed to measure the spectral power of a three-color LED as shown in FIG. 5. Initial theoretical estimation of the three-color LED backlight is made in order to show the current LED backlight structure and technology about increasing color gamut backlight and to show differences of the color filterless LCD in the color gamut. For example, as shown in FIG. 6, it is apparent that the gamut of the primary LED backlight is 100.28% NTSC and the gamut of increased color gamut according to the invention is 117.41% NTSC, which is higher than the primary color gamut by approximately 17% NTSC. LCD color gamut of color filterless is 119.02% NTSC, which difference with the gamut of increased color gamut is about 1.5%.

In view of the above, it is found that in the technology of increased color gamut backlight, the color gamut of display can be increased significantly. The color gamut has a range about the same as the increasing color gamut of a three-color LED. Finally, there is no need to greatly modify the construction of the display.

Figure 7:
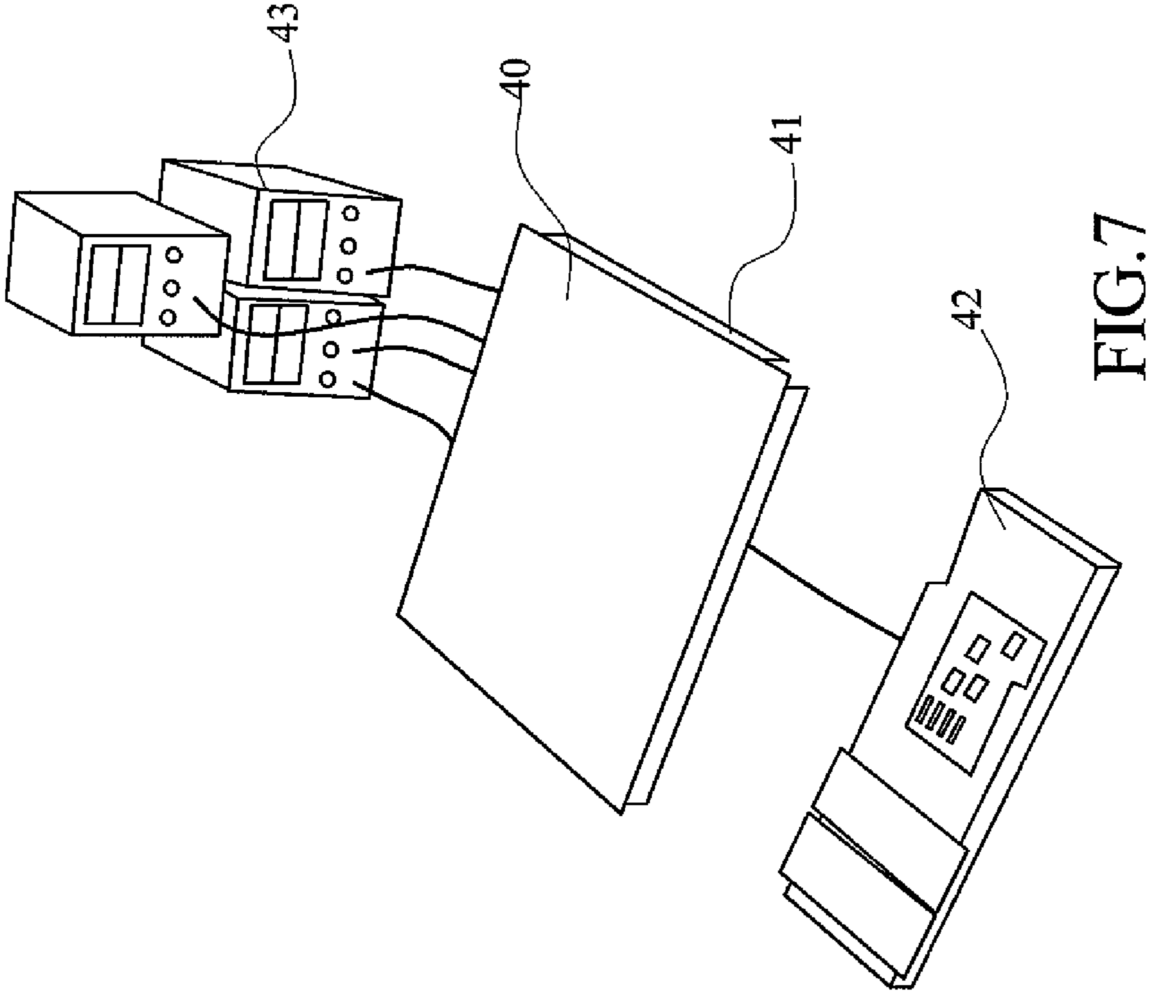
FIG. 7 is a schematic view showing an apparatus constructed according to the method of the invention.
Figure 8:
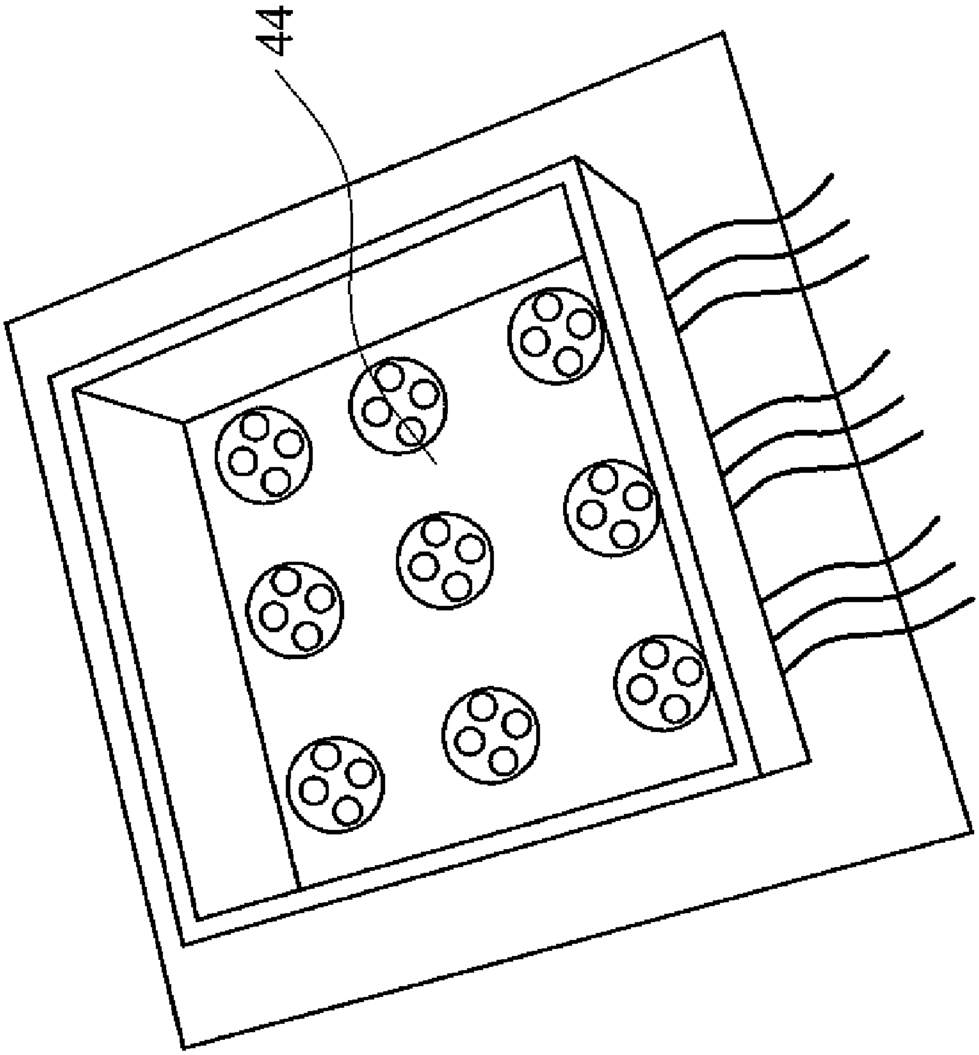
FIG. 8 is a schematic view showing the structure of an LED backlight source according to the invention.

An LCD panel and its backlight structure employed by the invention are described by referring to FIGS. 7 and 8. The LCD panel being used is a 19" LCD manufactured by Samsung Company. Its CCFL backlight source is removed with only a panel 40 being left. A color filter and a diffuser are replaced with a backlight module 41 having LEDs of three primary colors. The backlight module 41 is electrically connected to a panel drive circuit 42 and a power supply 43 respectively (FIG. 7). A backlight source 44 is provided with 3×3 units each having four RGGB LEDs. For making emitted light uniform when mixing LED backlight sources, a reflecting diffusion film is adhered on a light emitting hole of each LED.

Figure 9:
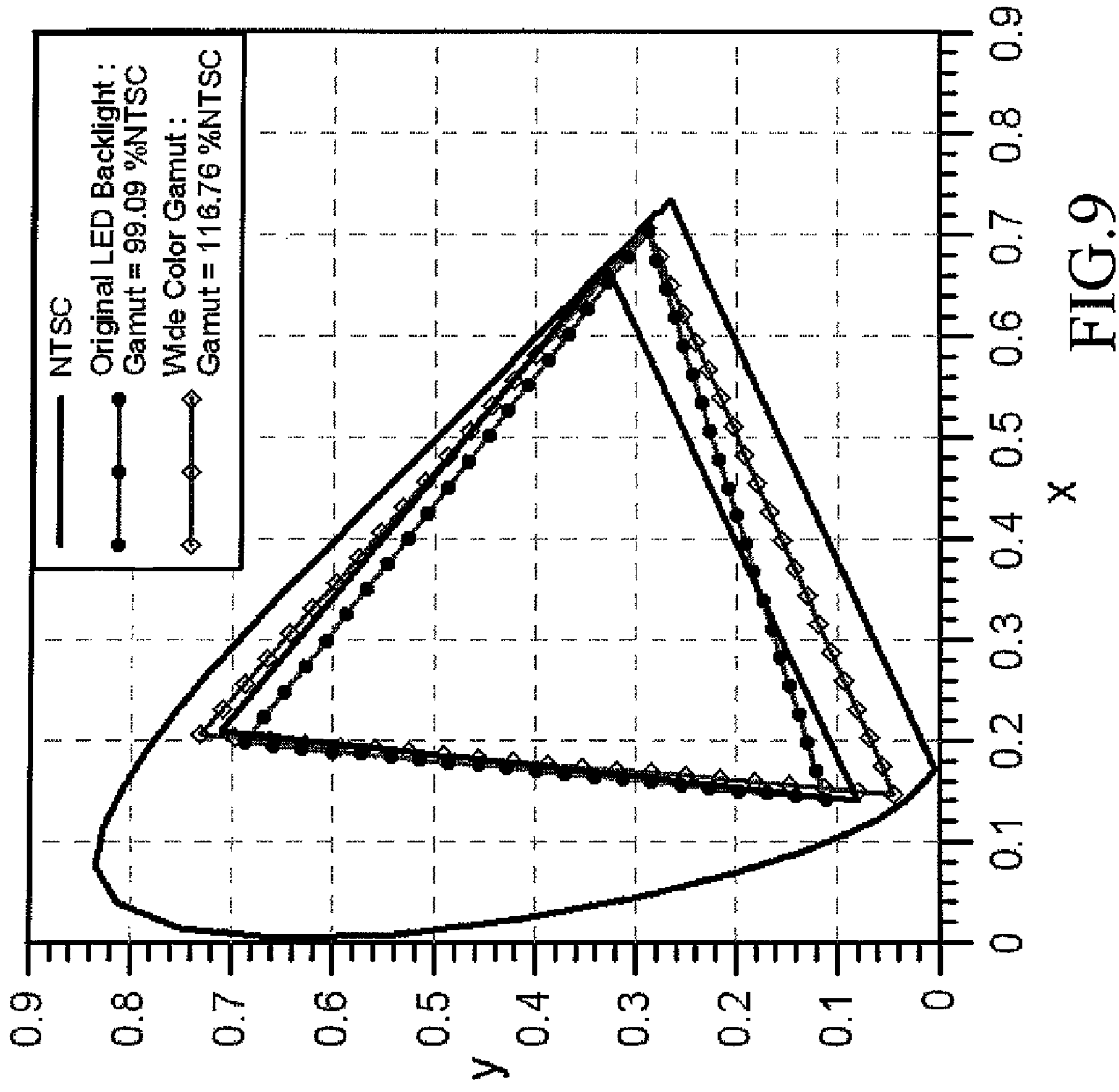
FIG. 9 is a chromaticity diagram of the entire range of possible chromaticities, NTSC, original LED backlight, and wide color gamut for comparison according to the invention.
Figure 10:
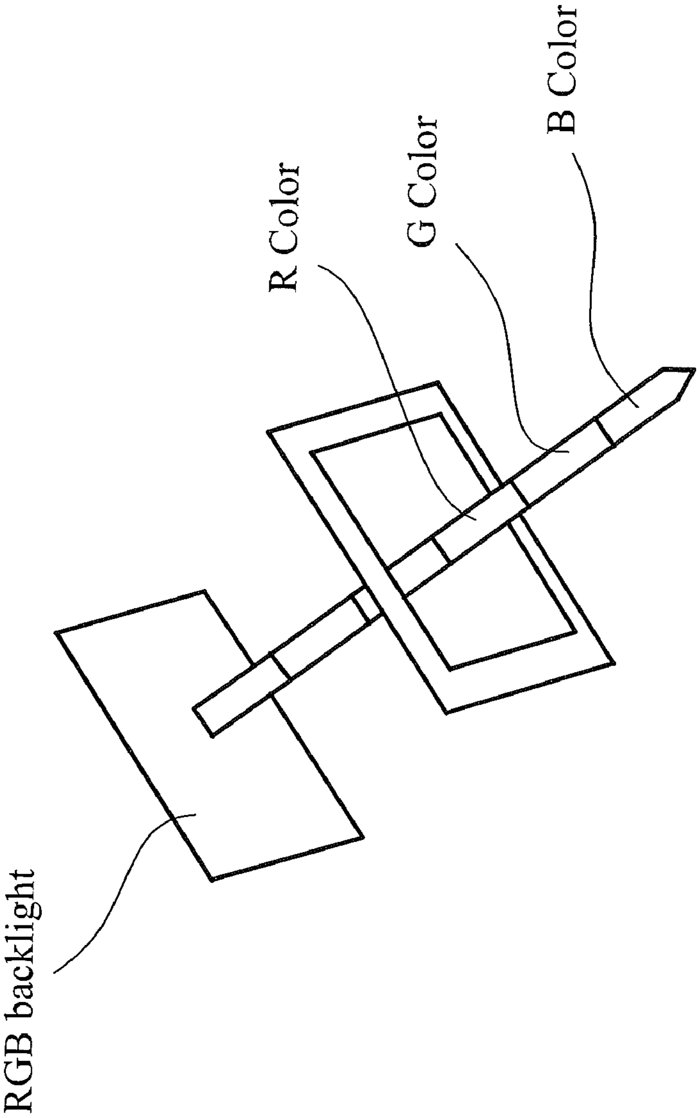
FIG. 10 PRIOR ART
FIG. 10 is a schematic view of a conventional color filterless display.

Referring to FIG. 9, a chromaticity diagram of the entire range of possible chromaticities, NTSC, original LED backlight, and wide color gamut for comparison according to the invention is shown. The horseshoe shape represents the entire range of possible chromaticities. Gamut area of NTSC is represented by a solid line triangle. Gamut area of the original LED backlight is represented by a triangle enclosed by a solid line dotted with spots. Gamut area of the wide color gamut is represented by a triangle enclosed by a solid line dotted with squares. It is evident that a color gamut area enclosed by the solid line dotted with squares is larger than that enclosed by solid line dotted with spots. In view of the given data, the color gamut is increased from 99% NTSC to 116.76% NTSC, about 18% NTSC. Thus, it is evident that the color gamut can be increased by taking advantage of the technology of increasing color gamut backlight. As an end, it is possible to make the picture seen from a display to be more vivid.

It is apparent that there is no need to remove CF in the invention. Also, the method is compatible with existing manufacturing processes. Thus, regardless of which display is used and of the quick or slow response time of a display, the effect of obtaining each different primary color by mixing by the pixels can be achieved. Further, the color gamut of the display is greatly increased. More importantly, there is no requirement for a conventional LCD display device without color filterless to have a sufficiently short response time.

While the invention herein disclosed has been described by specific embodiments, numerous modifications and variations could be made thereto by those skilled in the art without departing from the scope and spirit of the invention set forth in the claims.

What is claimed is:

1. A method of increasing color gamut, comprising:

(i) segmenting each pixel of a color display of red (R), green (G), and blue (B) primary colors into first and second groups by grouping primary color light sources of the color display device with a corresponding light intensity adjustment mechanism such that a response spectrum of the light intensity adjustment mechanism of each group of subpixels minimizes overlapping with response spectrums of the remaining groups; and (ii) enabling the first group of subpixels for a first time frame, activating a group of the primary color light sources to emit primary color lights, activating the corresponding light intensity adjustment mechanism, and disabling the second group of subpixels for the first time frame; and (iii) enabling the second group of subpixels for a second time frame, activating a remaining group of primary color light sources to emit primary color lights, activating the corresponding light intensity adjustment mechanism, and disabling the first group of subpixels for the second time frame, with each group of subpixels being activated by turns for a time frame to create a complete picture by temporal color-mixing wherein the first group of subpixels includes the primary color light sources and the corresponding light intensity adjustment mechanism of Red (R) and Green (G) and the second group of subpixels includes the primary color light sources and the corresponding light intensity adjustment mechanism of Red (R) and Blue (B).

2. The method of claim 1, wherein the light intensity adjustment mechanism is capable of adjusting light intensity of each primary color light source.

3. The method of claim 1, wherein the light intensity adjustment mechanism includes liquid crystals, polarizers, and color filters.

4. The method of claim 1, wherein time frames of the first and second groups of subpixels are shorter than time required for human eyes to perceive.

* * * * *